(12) United States Patent
Tozaki et al.

(10) Patent No.: US 6,260,889 B1
(45) Date of Patent: Jul. 17, 2001

(54) CONNECTOR HAVING ENLARGEMENT RESTRAINING MEANS

(75) Inventors: Kenji Tozaki; Masatoshi Harada, both of Aichi-ken; Hisatsugu Goto, Nisshin; Yasushi Miyamoto, Okazaki, all of (JP)

(73) Assignee: Kabushiki Kaisha Togo Seisakusho (JP)

( * ) Notice: Subject to any disclaimer, the term of this patent is extended or adjusted under 35 U.S.C. 154(b) by 0 days.

(21) Appl. No.: 09/216,302

(22) Filed: Dec. 18, 1998

(30) Foreign Application Priority Data

Dec. 19, 1997 (JP) .................................................... 9-351207

(51) Int. Cl.[7] .................................................. F16L 39/00
(52) U.S. Cl. ........................................... 285/321; 285/314
(58) Field of Search ................................... 285/319, 314, 285/321, 305, 308, 358, 39

(56) References Cited

U.S. PATENT DOCUMENTS

| | | | | |
|---|---|---|---|---|
| 1,029,819 | * | 1/1912 | Nylander | 285/314 |
| 2,869,099 | * | 1/1959 | Robinson | 285/307 |
| 3,635,501 | * | 1/1972 | Thorne-Thomsen | 285/314 |
| 5,596,790 | | 1/1997 | Möller. | |
| 5,607,190 | * | 3/1997 | Exandier et al. | 285/319 |
| 5,704,658 | * | 1/1998 | Tozaki et al. | 285/321 |
| 5,826,918 | * | 10/1998 | Bowles et al. | 285/319 |
| 5,890,749 | * | 4/1999 | Fukaya et al. | 285/319 |

FOREIGN PATENT DOCUMENTS

| | | |
|---|---|---|
| 07071673A | 3/1995 | (JP). |
| 07260073A | 10/1995 | (JP). |
| 08233181A | 9/1996 | (JP). |
| 09287684A | 11/1997 | (JP). |
| 09303654A | 11/1997 | (JP). |
| 10026277A | 1/1998 | (JP). |
| 11173479A | 6/1999 | (JP). |

* cited by examiner

Primary Examiner—Lynne H. Browne
Assistant Examiner—Tomlyne A Malcolm
(74) Attorney, Agent, or Firm—Patterson, Thuente, Skaar & Christensen, P.A.

(57) ABSTRACT

A connector includes a body and a clip for fitting on the body. The body has a hose connecting portion and a pipe receiving portion. The pipe receiving portion is adapted to receive a pipe therein and includes a clip fitting part. The clip fitting part has an engaging hole for engagement with an engaging claw formed on the clip. The engaging claw moves from a protruded position for preventing removal of the pipe to a withdrawn position for permitting removal of the pipe from the pipe receiving portion as the operator forces the clip to be enlarged. An enlargement restraining device is provided that is operable to restrain the enlargement of the clip within a predetermined range, so that the clip can reliably resiliently return to the protruded position when the clip is released after the pipe has been removed from the pipe receiving portion.

21 Claims, 6 Drawing Sheets

CONNECTOR HAVING ENLARGEMENT RESTRAINING MEANS

FIELD OF THE INVENTION

The present invention relates to connectors, and in particular, to connectors that are useful, for example, to connect a fuel pipe to a fuel hose of automobiles.

DESCRIPTION OF THE RELATED ART

U.S. Pat. No. 5,704,658 in the name of one of the same assignees as the present application discloses connectors for connecting a fuel pipe and a fuel hose of automobiles. This U.S. patent teaches connectors having engaging claws and engaging protrusions to connect a clip and a body of the connectors.

U.S. Pat. No. 5,596,790 discloses metal clips that have a stop for limiting the enlargement of the clips. However, the clips only serve to clamp a hose, and do not serve to fix a pipe in position, which pipe is inserted into a connector body.

SUMMARY OF THE INVENTION

An object of the present invention to provide improved connectors.

In particular, a connector is taught having engaging protrusions or claws on a clip that is a separate piece from a body having engaging holes. Preferably, the body also has means for ensuring that the clip always can be rotated or opened by a suitable amount of rotation and enlargement of the clip, even when the clip is handled (rotated) by different operators. Such means provide an appropriate range of movement, so that the clip is not damaged by overstretching the clip when removing the pipe from the connector body. As a result, the connector is not damaged by the operation of connecting the pipe to the connector body or by removing the pipe from the connector body.

Other objects, features and advantages of the present invention will be readily understood after reading the following detailed description together with the accompanying drawings and the claims.

DETAILED DESCRIPTION OF THE INVENTION

Accordingly, connectors are taught having restraining means provided between a connector body and a clip for ensuring a suitable degree of rotation and enlargement of the clip.

Preferably, the restraining means comprises a recess and either a protrusion or a pin that is insertable into the recess.

The means for restraining the enlargement of the clip can be made according to a variety of constructions For example. in a first representative embodiment, a recess is formed in a flange that is disposed around an outer peripheral surface of a body, and a protrusion is formed on a clip for insertion into the recess. Alternatively, in a second representative embodiment, a recess is formed in the clip, and a protrusion is formed on a flange that is disposed around the outer peripheral surface of the body. Further, in a third representative embodiment, a recess is formed in the clip, and a pin is provided on the outer surface of the body for insertion into the recess. Those skilled in the art will recognize that other construction can be utilized to perform the function of restraining the enlargement of the clip.

According to the preferred embodiments described further below, the range of rotation and enlargement of the clip is defined by the shiftable range of the protrusion or the pin within the recess. More specifically, the recess determines the deformable (rotatable) range of the clip from a state in which the engaging claw engages the engaging hole so as to prevent removal of a pipe to a state in which the engaging claw is withdrawn from the engaging hole to permit removal of the pipe. Therefore, any operator can reliably remove the pipe from the body without damaging the clip or connector body.

Each of the additional features and method steps disclosed above and below may be utilized separately or in conjunction with other features and method steps to provide improved connectors, and methods for making the same. Representative examples of the teachings of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe representative and preferred embodiments of the invention.

Therefore, particularly preferred embodiments of the present invention will now be described in further detail with reference to the drawings.

Figure 1:
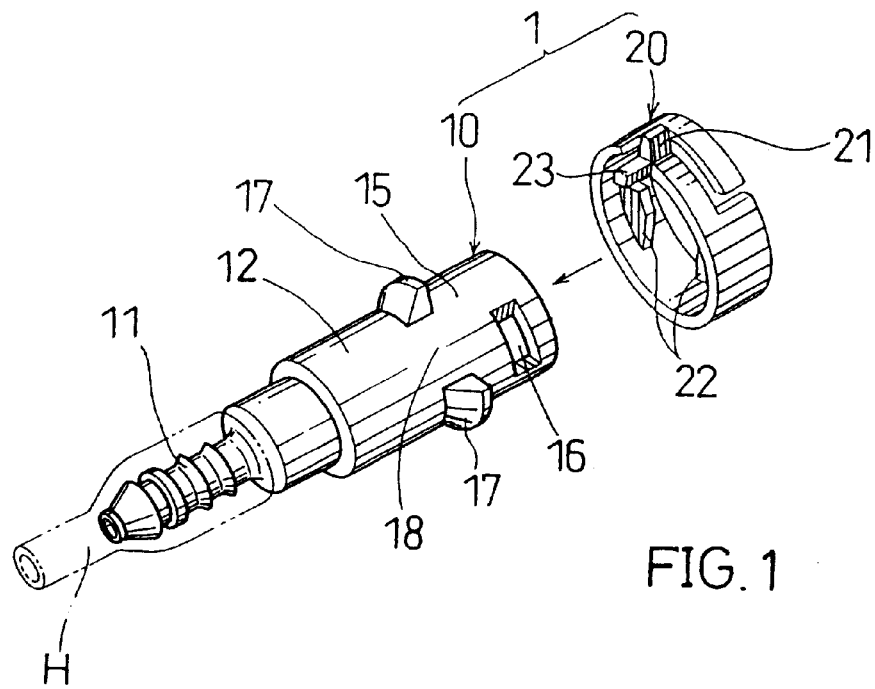
FIG. 1 is a perspective view of a body and a clip of connectors according to a first representative embodiment.
Figure 2:
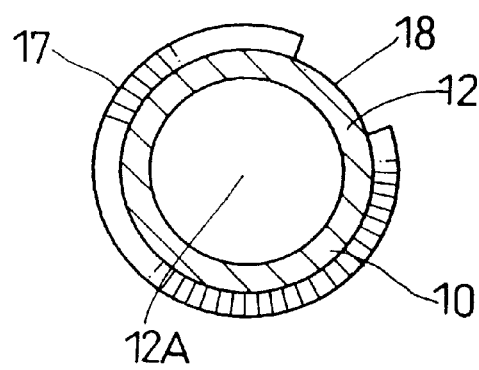
FIG. 2 is a sectional view in a diametrical direction of the body.
Figure 4:
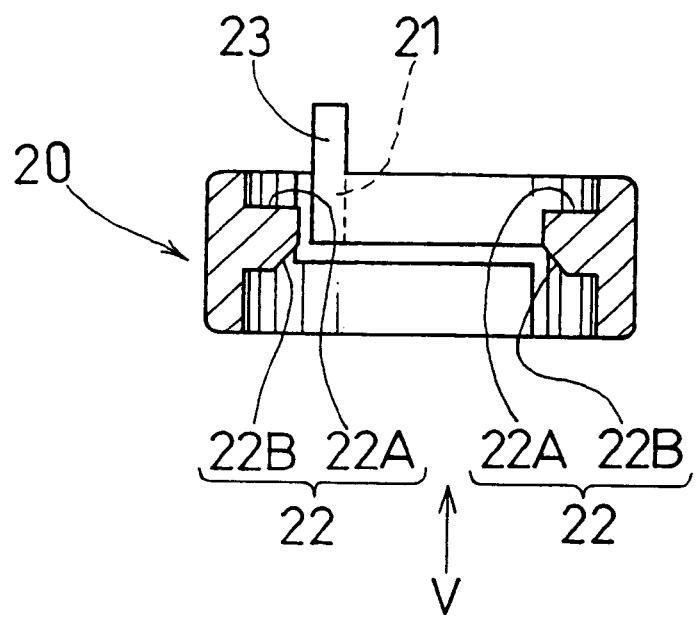
FIG. 4 is a vertical sectional view of the clip.
Figure 5:
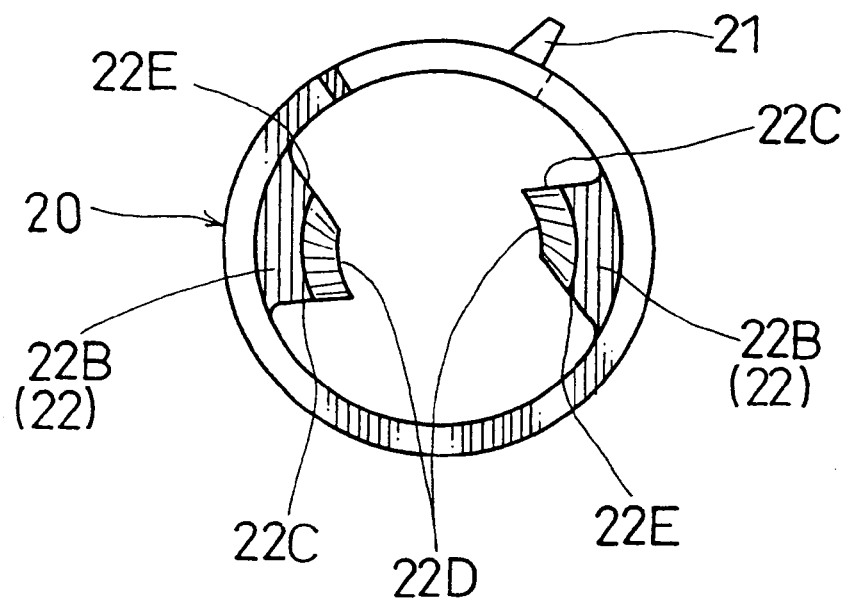
FIG. 5 is a view in a direction of arrow V in FIG. 4.
Figure 6:
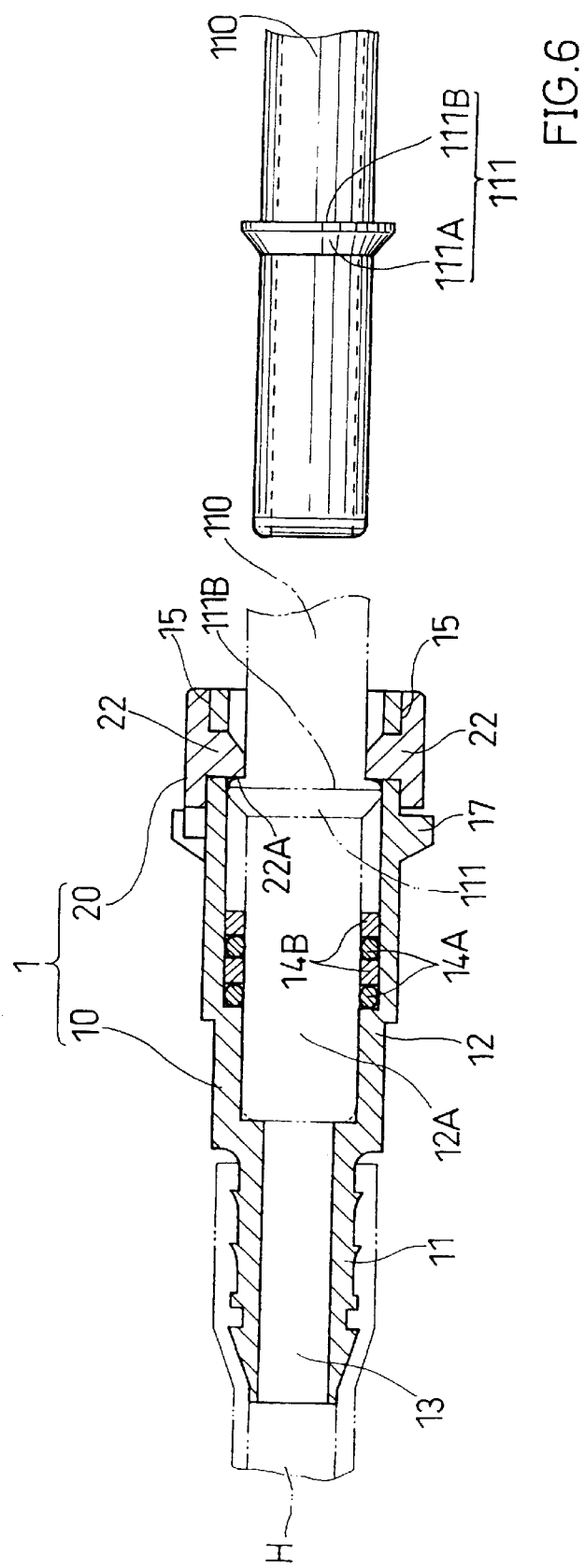
FIG. 6 is a sectional view of the connector with one end of a pipe shown in a side view.

FIGS. 1 to 11 show a connector 1 according to a first detailed representative embodiment. As shown in FIGS. 1 and 6, the connector 1 may include a tubular body 10 and a clip 20 that serves to prevent a pipe 110, such as a fuel pipe, from being removed from the body 10.

As shown in FIG. 6. the pipe 110 preferably includes a flange-like removal prevention protrusion 111 formed on its front portion that is adapted to be inserted into the body 10. The construction of the pipe 110 itself is the same as known pipes that are further discussed in U.S. Pat. No. 5,704,658. The removal prevention flange 11 may include a tapered front surface 111A and an upright rear surface 111B. The front surface 111A is tapered in a forward direction (leftward as viewed in FIG. 6). The rear surface 111B serves as an engaging surface as will be explained later. The removal prevention flange 11 preferably is spaced from the front end of the pipe 110 by a predetermined distance.

The body 10 preferably has a hose connecting portion 11 on one side, and has a pipe receiving portion 12 on the other side as shown in FIGS. 1 and 6. A hose H such as a fuel hose may be fitted on the hose connecting portion 11. The pipe receiving portion 12 has an axial hole 12A into which the pipe 10 may be inserted. The axial hole 12A may have a large diameter part and a small diameter part on the side of the entrance and the opposite side, respectively. The large diameter part extends by a predetermined range on the side of the entrance of the axial hole 12A for permitting insertion of the removal prevention flange 111 of the pipe 110. The small diameter part permits insertion of the front end of the pipe 110 but does not permit insertion of the removal prevention flange 111. The small diameter portion of the axial hole 12A is in communication with a communication hole 13 that is formed in the hose connecting portion 11. The communication hole 13 may have a smaller diameter than the small diameter part of the axial hole 12A. O-rings 14A and gaskets 14B may be fitted in the large diameter part of the axial hole 12A in a region opposite to the entrance of the axial hole 12A, so that the pipe 110 can sealingly contact the O-rings 14A and the gaskets 14B.

Figure 7:
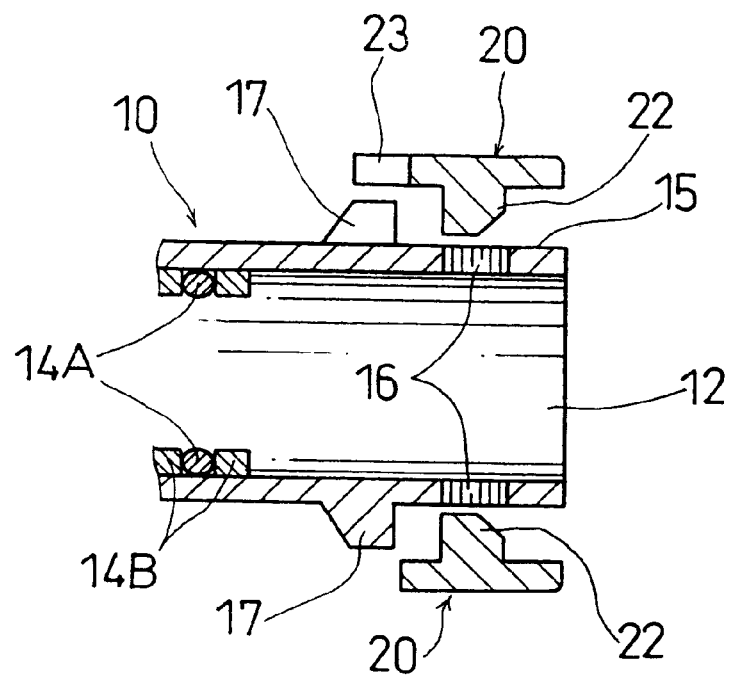
FIG. 7 is an explanatory sectional view showing the operation for fitting the clip on the body.
Figure 8:
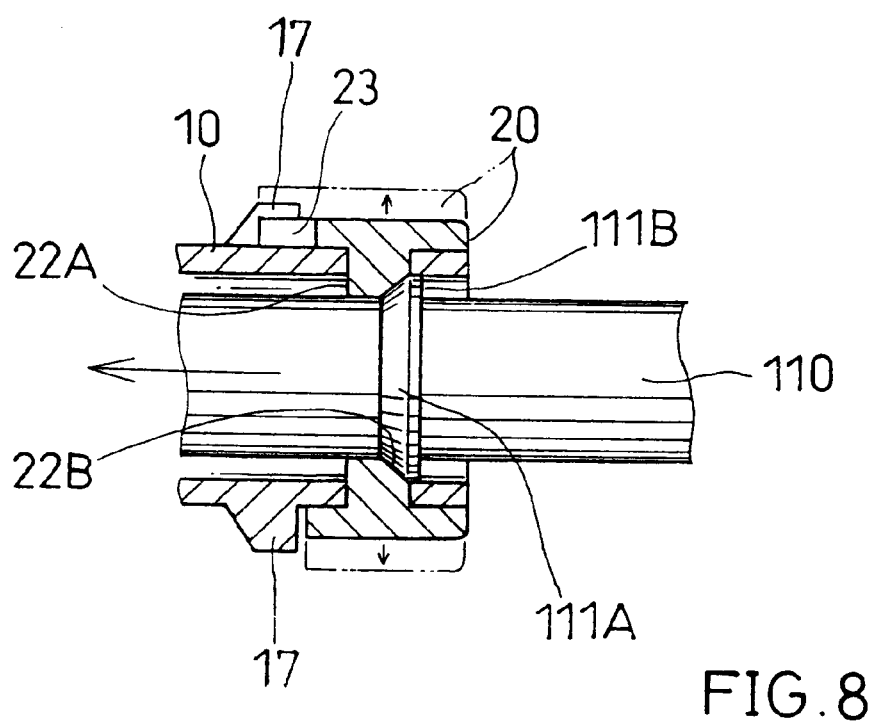
FIG. 8 is an explanatory sectional view showing the operation where a removal prevention protrusion of the pipe abuts rear surfaces of engaging claws of the clip.

Preferably, the pipe receiving portion 12 has a clip fitting part 15 at its entrance for fitting the clip 20 thereon. As shown in FIG. 6, the thickness of the pipe receiving portion 12 at the clip fitting part 15 or at the large diameter part of the axial hole 12A may be less than the thickness at the small diameter part of the axial hole 12A. In addition, as shown in FIG. 7, a pair of engaging holes 16 may be formed in the clip fitting part 15 in opposite relationship with each other in a diametrical direction. The engaging holes 16 serve to receive their corresponding engaging claws 22 as will be described later. Further details concerning the engaging claws, engaging holes and pipe receiving portions are taught by U.S. Pat. No. 5,704,658, which U.S. patent is hereby incorporated by reference.

Preferably, a flange 17 with a recess 18 is formed on an outer surface of the pipe receiving portion 12 in a position forward of the clip fitting part 15. The flange 17 protrudes diametrically outwardly from the pipe receiving portion 12 and has an arcuate or arched configuration extending along the circumferential surface of the pipe receiving portion 12. The recess 18 defines a movable range of a protrusion 23 of the clip 20 which will be described later. A rear surface of the flange 17 on the side of the clip fitting part 15 (on the side of the entrance of the pipe receiving portion 12) is formed as a flat and smooth upright surface on which an end surface of the clip 20 may abut. Preferably, the hose connecting portion 11 and the pipe receiving portion 12 including the flange 17 are integrally molded either from a plastic having a great strength or from a reinforced plastic such as fiberglass reinforced nylon-12.

Preferably, the clip 20 has a ring-like configuration with a cut part and has two end portions 20A in the circumferential direction. The clip 20 may be made of any plastic material having an appropriate resiliency, such as nylon-12, so that clip 20 can be resiliently deformed to enlarge Its diameter. Preferably, the clip 20 returns to its original diameter when the enlarging force is released. Therefore, in the state before the clip 20 Is fitted onto the clip fitting part 15, the inner diameter of the clip 20 may be slightly smaller than or equal to the outer diameter of the clip fitting part 15 of the body 10. For example, the clip 20 may be formed by a rectangular plastic strip that has a predetermined width and length and both ends have cut-out recesses formed on different sides from each other in the widthwise direction. The strip is bent to have a ring-like configuration, so that each of the end portions 20A has a finger-like configuration that enters the cut-out recess of the end portion 10A opposite thereto.

Figure 3:
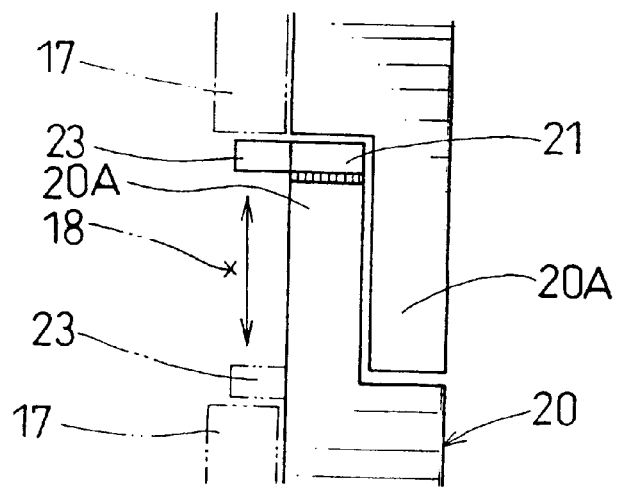
FIG. 3 is a partial plan view of the clip.

As shown in FIGS. 1 and 3, at least one of the end portions 20A of the clip 20 on the front side may include a knob 21 that protrudes radially outward from the corresponding end portion 20A. The protrusion 23 may be formed on one of the end portions 20A adjacent to the knob 21, and preferably at the same circumferential position as the knob 21. The protrusion 23 extends forward horizontally from the end portion 20A and is adapted to be inserted into the recess 18 of the flange 17 of the body 10 so as to restrain the rotation and enlargement of the clip 20 relative to the body 10 within the range corresponding to the circumferential length of the recess 18. A pair of engaging claws 22 may be formed on the inner peripheral surface of the clip 20, so that the engaging claws 22 extend inwardly from the inner peripheral surface of the clip 20.

The engaging claws 22 preferably are positioned opposite each other in the diametrical direction for engagement with the corresponding engaging holes 16 of the pipe receiving portion 12 of the body 10, so that the engaging claws 22 can protrude into the axial hole 12A through the corresponding engaging holes 16 so as to reliably prevent the pipe 110 from removal from the body 10. Preferably, the position of the protrusion 23 in the circumferential direction of the clip 20 is determined such that:

(1) the protrusion 23 is positioned at one end of the recess 18 in the circumferential direction when the engaging claws 22 engage their corresponding engaging holes 16; and (2) the protrusion 23 is positioned at the other end of the recess 18, that end permits the clip 20 to resiliently return to its original state, when the clip 20 has been enlarged to increase its diameter subsequent to the removal of the engaging claws 22 from the engaging holes 16, as will be explained later.

Thus, the recess 18 of the flange 17 and the protrusion 23 of the clip 20 cooperate with each other to comprise an rotation and enlargement prevention means of the clip 20 when the clip 20 is fitted on the clip fitting part 15.

The knob 21 is operable by the operator for rotating and enlarging the clip 20 about the clip fitting part 15. By positioning the protrusion 23 adjacent to the knob 21, and preferably at the same circumferential position as the knob 21, the knob 21 can be shifted by a great distance for reliably withdrawing the engaging claws 22 from the engaging holes 16 of the pipe receiving portion 12.

The configuration of the engaging claws 22 formed on the inner peripheral surface of the clip 20 will now be described. As shown in FIG. 4, each of the engaging claws 22 has an upright front surface 22A and an inclined rear surface 22B. The front surface 22A extends radially inward of the clip 20 and serves to engage the rear surface 111A of the removal prevention protrusion 111 of the pipe 110. The rear surface 22B is inclined radially outward in the rearward direction (downward direction as viewed in FIG. 4). Preferably, the rear surface 22B is formed as a part of a conical surface having a diameter increasing in the rearward direction. Therefore, the removal prevention protrusion 111 can easily pass through the clip 20 beyond the engaging claws 22. Therefore, so that the pipe 110 can be smoothly inserted into the pipe receiving portion 12 as will be explained later. The radial length of the engaging claws 22 is suitably determined to be able to engage the removal prevention protrusion 111 of the pipe 110 when the engaging claws 22 protrude into the pipe receiving portion 12 through the engaging holes 16.

With regard to the inner circumferential configuration of the engaging claws 22, each of the engaging claws 22 preferably has a first side surface 22C, an innermost surface 22D and a second side surface 22E as shown in FIG. 5. The first side surface 22C is configured as an upright surface extending substantially in a radial direction of the clip 20. The innermost surface 22D is configured as a curved concave surface having a curvature that corresponds to the curvature of the outer surface of the pipe 110. Alternatively, the innermost surface 22D may have a concave configuration without curvature. The second side surface 22E is configured as an inclined surface that extends from the inner surface of the clip 20 obliquely relative to the diametrical direction of the clip 20.

The operation of this preferred representative embodiment will now be described with reference to FIGS. 1 and 7.

First, an operator fits the clip 20 on the body 10 by positioning the clip 20 relative to the body 10 such that the protrusion 23 of the clip 20 is pointed toward the recess 18 of the flange 17 of the body 10 and such that the engaging claws 22 align with the engaging holes 16 in the axial direction as shown in FIG. 1. Then, the operator may forcibly open the clip 20 to increase its diameter by means of an appropriate jig or tool (not shown) until the diameter of the clip 20 becomes greater than the diameter of the clip fitting part 15 of the body 10. Alternatively, by providing the same knob 21 also on the other end portion 20A of the clip 20 (that is shown in the drawings as not having the knob 21), the operator can manually open the clip 20 by pinching the knobs 21 together to move them toward each other. Thus, clips are taught that can be opened with and without a tool.

After the clip 20 has thus been opened to have an increased diameter, the operator puts the clip 20 over the clip fitting part 15 of the body 10 such that the protrusion 23 enters the recess 18 of the flange 17 and such that the engaging claws 22 are aligned with the engaging holes 16. Then, the operator releases the clip 20 (whether by jig, tool or hand), so that the clip 20 resiliently returns to its original shape, thereby decreasing its diameter. As a result, the engaging claws 22 enter or engage the corresponding engaging holes 16.

In such an engaging state, the engaging claws 22 protrude into the axial hole 12A of the pipe fitting portion 12, and the protrusion 23 is positioned adjacent to one end of the recess 18 in the circumferential direction as indicated by solid lines in FIG. 3. The protrusion 23 may be shifted to the other end of the cut 8 as indicated by chain lines in FIG. 3 by the pulling or pushing operation of the knob 21. As the protrusion 23 is shifted to this positions the engaging claws 21 retract from the axial hole 12A to permit the removal of the pipe 110 but are still held in engagement with the engaging holes 16. When the operator releases the knob 21, clip 20 returns to its original configuration, thereby decreasing its diameter, so that the engaging claws 22 again protrude into the axial hole 12A and so that the protrusion 23 returns to its original position or the position at one end of the recess 8.

Next, one end of the pipe 110 having the removal prevention protrusion 111 is inserted into the axial hole 12A of the pipe receiving portion 12. As the pipe 110 moves into the axial hole 12A, the front surface 111A of the removal prevention protrusion 12 abuts the rear surfaces 22B of the engaging claws 22. As described previously, the front surface 111A of the removal prevention protrusion 111 is tapered to have a diameter decreasing in the forward direction while the rear surfaces 22B of the engaging claws 22 are inclined radially outwardly in the rearward direction. Therefore, the clip 20 is forced to increase its diameter when the pipe 110 is pressed into the axial hole 12A after the removal prevention protrusion 111 has abutted the rear surfaces 22B of the engaging claws 22. As a result, the removal prevention protrusion 111 can move further into the axial hole 12A beyond the engaging claws 22. Immediately after the removal prevention protrusion 111 has moved beyond the engaging claws 22, the engaging claws 22 returns to again protrude into the axial hole 12A as shown in FIGS. 6 and 7 and the clip 20 returns to the fitted state on the clip fitting part 15.

The pipe 110 is thus connected to the body 10. In this connected state, one end of the pipe 110 is sealed against the inner surface of the pipe receiving portion 12 by means of the O-rings 14A and the gaskets 14B. The hose H is thereafter fitted on the hose connecting portion 11.

Figure 9:
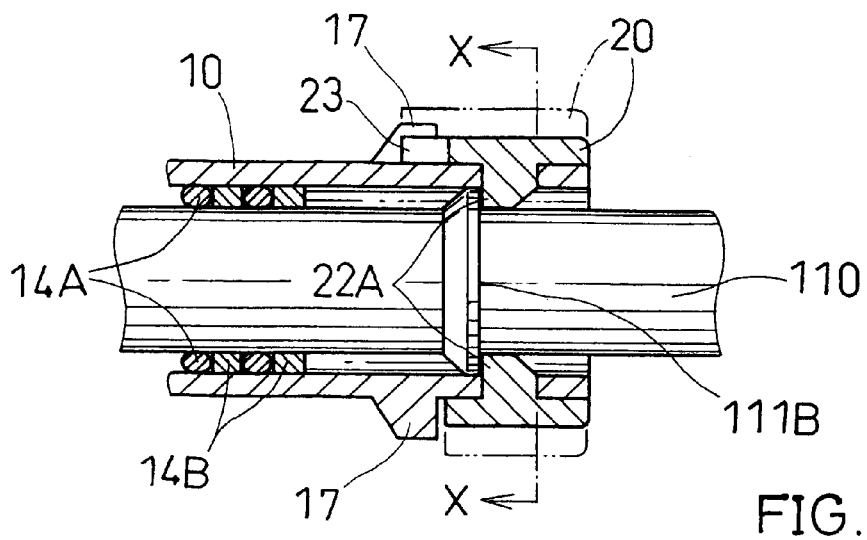
FIG. 9 is an explanatory sectional view showing the operation where the inserted pipe is prevented from removal by the engaging claws.
Figure 10:
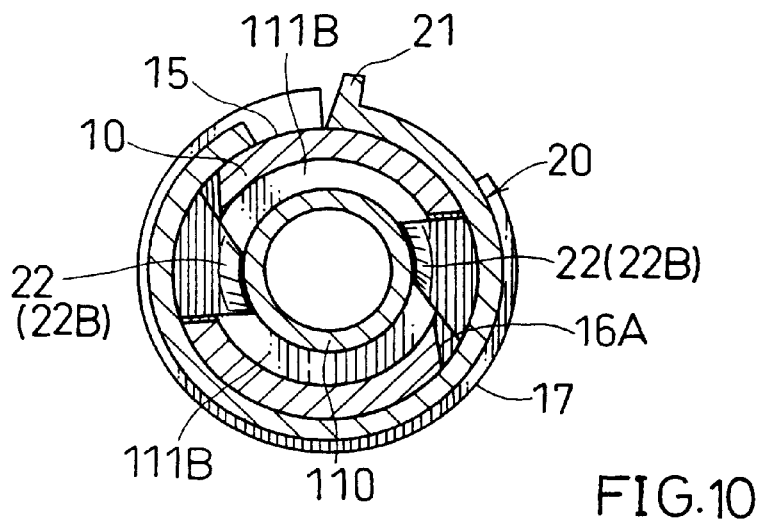
FIG. 10 is a sectional view taken along line X—X in FIG. 9.

With the pipe 110 thus connected to the body 10, the pipe 110 cannot be removed from the body 10, because the upright rear surface 111B of the removal prevention protrusion 111 abuts the upright front surfaces 22A of the engaging claws 22 as shown in FIGS. 6, 9 and 10, even if an external force is applied to the pipe 15 in a direction to withdraw the same from the body 10.

In order to remove the pipe 110 from the body 10, the operator pushes or pulls the knob 21 of the clip 20 so as to shift the protrusion 23 from one end to the other end of the recess 18 of the flange 17, so that the clip 20 is enlarged to some extent while it rotates about the clip fitting part 15 by a short distance in some cases. When the protrusion 23 reaches the other end of the recess 18, the engaging claws 22 are withdrawn from the axial hole 12A while they are still held in engagement with the engaging holes 16. As a result, the pipe 110 can be easily and reliably removed from the body without causing the abutment of the removal prevention protrusion 111 with the engaging claws 22.

Figure 11:
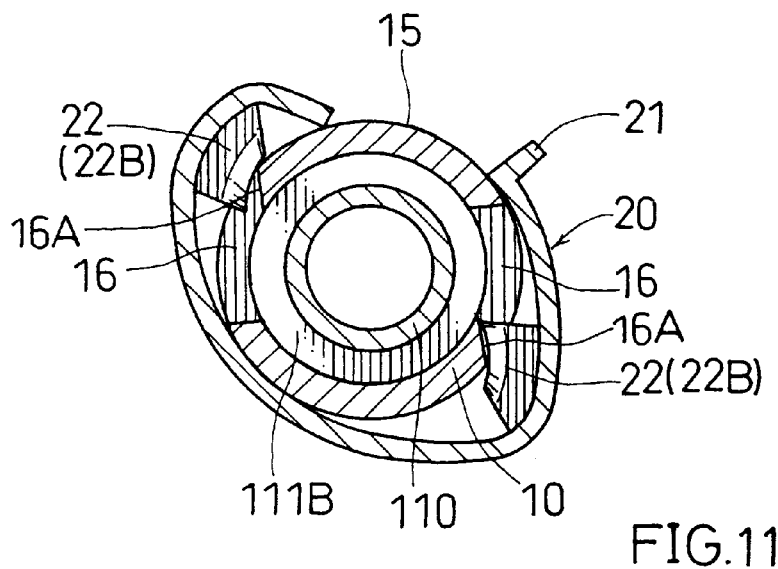
FIG. 11 is a sectional view similar to FIG. 10 but showing the operation where the clip is enlarged to retract the engaging claws from the axial hole of the body.

Preferably, in order to assist the retracting movement of the engaging claws 22 from the axial hole 12, one edge 16A of each of the engaging holes 16 opposite to the inclined second surface 22E of the corresponding engaging claw 22 is inclined in the circumferential direction of the body 10 that is the same direction as the second surface 22E as shown in FIGS. 10 and 11. Therefore, the engaging claws 22 can smoothly retract, with the inclined second surface 22E guided by the edge 16A.

Thus, with the clip 20 held by the operator in a position in which the protrusion 23 is at the other end of the recess 18 as shown in FIG. 3, the pipe 110 can be easily removed from the axial hole 12A. As described previously, in this state, each engaging claw 22 is withdrawn from the axial hole 12A but partly engages the corresponding engaging holes 16 as shown in FIG. 11.

After the pipe 110 has been removed, the operator releases the knob 21, so that the clip 20 returns to its original configuration and it rotates in the reverse direction by a short distance in some cases. Thus, the protrusion 23 returns to one end of the cut 18 as indicated by the solid lines in FIG. 3, and the engaging claws 22 return to protrude into the axial hole 12A. Thus, the clip 20 that was enlarged to permit removal of the pipe 110 can automatically return to the original diameter or can automatically recover its original shape. Because the clip 20 can quickly recover its original shape, the enlarged state does not continue for a relatively long time as in some known clips. Therefore, the resiliency of the clip 20 should not be weakened by the enlargement of the clip during the pipe removal operation.

In the above preferred representative embodiment, the rotation and enlargement restraining means comprises the protrusion 23 formed on the clip 20 and the recess 18 of the flange 17 formed on the body 10. However, the rotation and enlargement restraining means can also be realized, for example, by the second and third preferred embodiments shown in FIGS. 12 and 13, respectively. In these embodiments, the elements not shown in FIGS. 12 and 13 are the same as the first representative embodiment.

Figure 12:
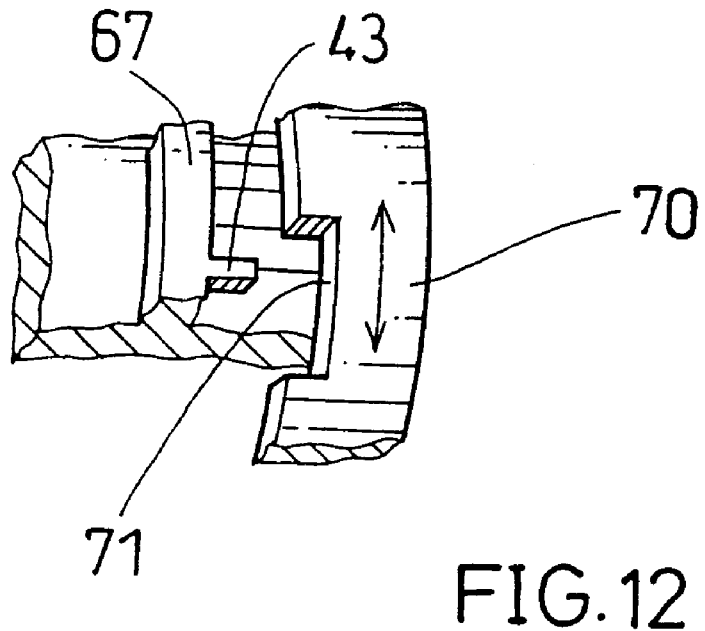
FIG. 12 shows the essential parts of connectors with modified enlarge restraining means according to a second representative embodiment.

In the second embodiment shown in FIG. 12, a flange 67 that corresponds to the flange 17 of the first embodiment does not include a recess but includes a protrusion 43 that extends into a recess 71 formed in a clip 70.

Figure 13:
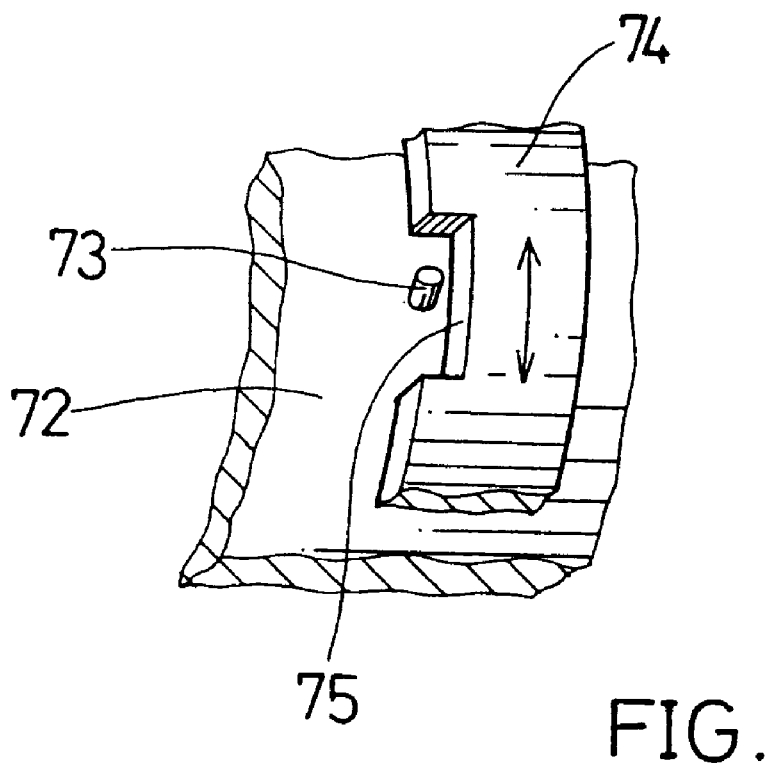
FIG. 13 shows the essential parts of connectors with further modified enlargement restraining means according to a third representative embodiment.

In the third embodiment shown in FIG. 13, an engaging pin 73 is formed on a clip fitting part 72 in place of a flange of the first embodiment and extends diametrically outwardly therefrom. The engaging pin 73 is positioned within a recess 75 that is formed in a clip 74. The recess 75 may be replaced by an elongated slot (not shown) formed in the clip 74.

The rotation and enlargement restraining means may have other constructions in addition to the above representative embodiments as long as the enlargement restraining means restrains the degree of rotation and enlargement of a clip between a first state where engaging claws of the clip engage a pipe and a second state where the pipe can be removed from a body and where the clip can resiliently reduce its diameter.

According to the above preferred embodiments, because the engaging claws serve to permit insertion of the pipe and to prevent removal of the inserted pipe, the operation for connecting the pipe to the body can be smoothly and reliably performed. In addition, because the enlargement restraining means restrains the enlargement of the clip within an appropriate degree when the clip is forced to be rotated and enlarged. For example, during a pipe removal operation, the clip may not be excessively enlarged. Thus, that the clip should not be damaged by a pipe removal operation. Therefore, any operator can reliably remove the pipe with excellent operability.

While the invention has been described with reference to preferred embodiments thereof, it is to be understood that modifications or variations may be easily made without departing from the spirit of this invention.

What is claimed is:

1. A connector comprising:

a body including a hose connecting portion and a pipe receiving portion, said pipe receiving portion being adapted to receive a pipe therein and including a clip fitting part, said clip fitting part having an engaging hole formed therein;

a clip adapted to be fitted on said clip fitting part of said pipe receiving portion and configured to cover an outer peripheral surface of said clip fitting part, said clip being operable to hold said pipe in a position relative to said pipe receiving portion;

an engaging claw disposed on an inner peripheral surface of said clip for protruding into said pipe receiving portion through said engaging hole or said clip fitting part so as to engage the pipe that has been inserted into said body;

said engaging claw being movable to permit insertion of the pipe into said pipe receiving portion and then to prevent the removal of the inserted pipe;

said engaging claw being movable from a protruded position that prevents removal of the pipe to a withdrawn position that permits removal of the pipe from said pipe receiving portion as said clip is rotated and enlarged; and means for restraining the enlargement by limiting the rotation of said clip within a range between a first state in which said engaging claw is in said protruded position and a second state in which said engaging claw is in said second withdrawn position.

2. The connector of claim 1 wherein at least one pair of engaging holes are formed in the inner peripheral surface of said clip fitting part, and wherein at least one pair of engaging claws are disposed on said clip in such positions that correspond to the positions of said at least one pair of said engaging holes.

3. The connector of claim 1 wherein said engaging claw has a rear surface that is inclined so that said engaging claw can be forced to retract for permitting movement of the pipe beyond said engaging claw with the aid of said rear surface.

4. The connector of claim 1 wherein said engaging claw partly engages said engaging hole when said clip is in said second state.

5. The connector of claim 1 wherein said engaging hole has an inclined edge in one circumferential direction and wherein said engaging claw has an inclined surface that opposes said inclined edge when said engaging claw engages said engaging hole.

6. The connector of claim 1 wherein said enlargement restraining means comprises a recess and a protrusion, said recess being formed in a circumferential flange protruding from said clip fitting part, said protrusion protruding from said clip, said clip being in said first state when said protrusion is at one circumferential end of said recess, and said clip being in said second state when said protrusion is at the other circumferential end of said recess.

7. The connector of claim 6 wherein said clip includes two circumferential ends opposing each other and includes a knob provided on one end of said circumferential ends, said protrusion being positioned at the same position as said knob in the circumferential direction or at a position adjacent said knob in the circumferential direction.

8. The connector of claim 1 wherein said enlargement restraining means comprises a protrusion and a recess, said protrusion extending from an annular or arcuate flange that protrudes from said clip fitting part, said recess being formed in said clip in the circumferential direction, said clip being in said first state when said protrusion is at one circumferential end of said recess, and said clip being in said second state when said protrusion is at the other circumferential end of said recess.

9. The connector of claim 1 wherein said enlargement restraining means comprises a pin extending from said clip fitting part and a circumferential recess formed in said clip, said clip being in said first state when said pin is at one circumferential end of said recess, and said clip being in said second state when said pin is at the other circumferential end of said recess.

10. The connector of claim 1 wherein said clip resiliently returns to said first state after being enlarged in said second state.

11. A connector comprising:

a body including a hose connecting portion and a pipe receiving portion, said pipe receiving portion being adapted to receive a pipe therein and including a clip fitting part, said clip fitting part having an engaging hole formed therein;

a clip adapted to be fitted on said clip fitting part of said pipe receiving portion and configured to cover an outer peripheral surface of said clip fitting part, said clip being operable to hold said pipe in a position relative to said pipe receiving portion;

an engaging claw disposed on an inner peripheral surface of said clip for protruding into said pipe receiving portion through said engaging hole or said clip fitting part so as to engage the pipe that has been inserted into said body;

said engaging claw being movable to permit insertion of the pipe into said pipe receiving portion and then to prevent the removal of the inserted pipe;

said engaging claw being movable from a protruded position that prevents removal of the pipe to a withdrawn position that permits removal of the pipe from said pipe receiving portion as said clip is enlarged; and means for restraining the enlargement of said clip within a range between a first state in which said engaging claw is in said protruded position and a second state in which said engaging claw is in said second withdrawn position, wherein said engaging hole has an inclined edge in one circumferential direction and wherein said engaging claw has an inclined surface that opposes said inclined edge when said engaging claw engages said engaging hole.

12. A connector comprising:

a body including a hose connecting portion and a pipe receiving portion, said pipe receiving portion being adapted to receive a pipe therein and including a clip fitting part, said clip fitting part having an engaging hole formed therein;

a clip adapted to be fitted on said clip fitting part of said pipe receiving portion and configured to cover an outer peripheral surface of said clip fitting part, said clip being operable to hold said pipe in a position relative to said pipe receiving portion;

an engaging claw disposed on an inner peripheral surface of said clip for protruding into said pipe receiving portion through said engaging hole of said clip fitting part so as to engage the pipe that has been inserted in to said body;

said engaging claw being movable to permit insertion of the pipe into said pipe receiving portion and then to prevent the removal of the inserted pipe;

said engaging claw being movable from a protruded position that prevents removal of the pipe to a withdrawn position that permits removal of the pipe from said pipe receiving portion as said clip is enlarged; and means for restraining the enlargement of said clip within a range between a first state in which said engaging claw is in said protruded position and a second state in which said engaging claw is in said second withdrawn position, said enlargement restraining means comprising a pin extending from said clip fitting part and a circumferential recess formed in said clip, said clip being in said first state when said pin is at one circumferential end of said recess, and said clip being in said second state when said pin is at the other circumferential end of said recess.

13. In combination:

a connector body comprising a hollow passage and a pipe receiving portion, wherein a clip receiving portion comprising an aperture is formed in the pipe receiving portion;

a clip adapted to be disposed around the clip receiving portion comprising:

an engaging claw disposed on an inner peripheral surface of the clip, wherein the engaging claw is adapted to move between at least:

a first position, in which the engaging claw protrudes through the aperture so as to engage a pipe received within the pipe receiving portion and prevent removal of the pipe from the pipe receiving portion and a second position, in which the clip has been enlarged by rotating the clip about the connector body so as to permit insertion of the pipe into the pipe receiving portion and withdrawal of the pipe from the pipe receiving portion; and means for restraining the enlargement of the clip within a range between the first position and the second position.

14. The combination of claim 13, said engaging claw comprising a rear surface that is inclined so that the engaging claw can be forced to retract for permitting movement of the pipe beyond said engaging claw with the aid of said rear surface.

15. The combination of claim 13, wherein said engaging claw partly engages said aperture when said engaging claw is in said second position.

16. The combination of claim 13, wherein said aperture has an inclined edge in one circumferential direction and wherein said engaging claw has an inclined surface that opposes said inclined edge when said engaging claw engages said aperture.

17. The combination of claim 13, wherein said enlargement restraining means comprises a recess and a protrusion, said recess being formed in a circumferential flange protruding from said clip receiving portion, said protrusion protruding from said clip, said clip being in said first position when said protrusion is at one circumferential end of said recess, and said clip being in said second position when said protrusion is at the other circumferential end of said recess.

18. The combination of claim 17, wherein said clip includes two circumferential ends, a knob, and a protrusion, the two circumferential ends opposing each other, the knob provided on one of said circumferential ends, said protrusion being positioned at the same position as said knob in the circumferential direction or at a position adjacent said knob in the circumferential direction.

19. The combination of claim 13, wherein said enlargement restraining means comprises a protrusion and a recess, said protrusion extending from an annular or arcuate flange that protrudes from said connector body, said recess being formed in said clip in the circumferential direction, said clip being in said first position when said protrusion is at one circumferential end of said recess, and said clip being in said second position when said protrusion is at the other circumferential end of said recess.

20. The combination of claim 13, wherein said enlargement restraining means comprises a pin extending from said pipe receiving portion and a circumferential recess formed in said clip, said clip being in said first position when said pin is at one circumferential end of said recess, and said clip being in said second position when said pin is at the other circumferential end of said recess.

21. The combination of claim 13, wherein said clip resiliently returns to said first position after being enlarged in said second position.

* * * * *